United States Patent [19]

Takao et al.

[11] Patent Number: 5,006,387
[45] Date of Patent: Apr. 9, 1991

[54] INFORMATION RECORDING MEDIUM

[75] Inventors: Toshiyuki Takao; Toshiaki Igata, both of Fujinomiya, Japan

[73] Assignee: Fujii Photo Film Co., Ltd., Kanagawa, Japan

[21] Appl. No.: 417,056

[22] Filed: Oct. 4, 1989

[30] Foreign Application Priority Data

Oct. 5, 1988 [JP] Japan ................. 63-251355

[51] Int. Cl.⁵ .................................................. B32B 3/00
[52] U.S. Cl. ........................................ 428/64; 421/65; 421/76; 421/913; 369/286; 369/288; 346/76 L; 346/135.1; 430/945
[58] Field of Search ..................... 428/64, 65, 76, 913; 369/286, 288; 346/76 L, 135.1; 430/945

[56] References Cited

U.S. PATENT DOCUMENTS 4,714,667 12/1987 Sato et al. ........................ 430/270
4,918,683 4/1990 Kodera et al. .................... 430/270

FOREIGN PATENT DOCUMENTS 94144 6/1983 Japan .

Primary Examiner—Patrick J. Ryan
Attorney, Agent, or Firm—Sixbey, Friedman, Leedom & Ferguson

[57] ABSTRACT

An improvement of an information recording medium comprising a substrate and a recording layer provided thereon which is capable of writing information with a laser beam is disclosed. The improvement comprises the recording layer comprising a metal layer containing Se and Te and a TeO$_x$ layer ($1 \leq x \leq 2$) deposited on the metal layer.

7 Claims, 3 Drawing Sheets

INFORMATION RECORDING MEDIUM

BACKGROUND OF THE INVENTION

1. Field of the Invention

The present invention relates to an information recording medium employable for optically recording and reproducing a desired information.

2. Description of Prior Art

Information recording media utilizing a beam of high energy density such as a laser beam have been developed in recent years and are now put into practical use. Such recording medium is generally called "optical disc" and the practical applications thereof have been found, for example, in a video disc and an audio disc as well as in a disc memory for a large-capacity computer and a large-capacity static image file.

The optical disc basically comprises a disc-shaped transparent substrate of plastic material or glass material and a recording layer provided thereon which is made of a metal such as Bi, Sn, In or Te or a semi-metal. Writing of information on the optical disc is conducted, for example, by irradiating the disc with a laser beam. The irradiated area of the recording layer of the optical disc absorbs energy of the beam, and rise in temperature locally occurs. As a result, a physical change such as formation of a pit or chemical change such as phase change is caused to alter optical characteristics of the recording layer in the irradiated area, whereby the recording of information is made. Reading of information from the optical disc is also conducted by irradiating the disc with a laser beam. The information can be reproduced by detecting reflected light or transmitted light corresponding to the alteration of the optical characteristics of the recording layer.

The optical disc is desired to have high durability as well as improved recording and reproducing characteristics. For the reason, studies for improving the recording layer have been made.

As a material employable in the recording layer, Te (tellurium) has been paid attention owing to its particularly high sensitivity in the recording procedure. However, such high-sensitive Te has the drawback in that Te is readily oxidized in contact with ambient atmosphere.

For the reason, Te is generally used in combination with other metals as mentioned below mainly to prevent Te from its oxidation and to improve the durability. For example, there have been known a recording layer composed of Se and Te (Japanese Patent Publication No. 59(1984)-35356), and a recording layer containing Te or Bi and Se (Japanese Patent Provisional Publication No. 57(1982)-38189).

Further, Japanese Patent Provisional Publication No. 57(1982)-66996) discloses a recording layer composed of a composition of Se, Te and metal selected from In, Pb, Sn, etc, which has the formula of $Se_aTe_bM_c$, wherein a, b and c are values in the ranges of $0.02 \leq a \leq 0.35$, $0.50 \leq b \leq 0.98$ and $0 \leq c \leq 0.45$, respectively, and M is one metal selected from the group consisting of Pb, In, Ge, S, Sb, As, Bi, Sn, Al, Ga, Tl, Zn, Cd, Au, Ag, Cu, Ni, Pd, Rh, Cr, Mo, W and Ta.

To improve the durability, it has been also proposed to provide a protective layer of tellurium oxide on the surface of a recording layer composed of Te from the viewpoint of protecting the recording layer (Japanese Patent Provisional Publication Nos. 58(1983)-94144, 58(1983)-189850 and 61(1986)-142541). However, although the provision of the protective layer of tellurium oxide is effective to improve durability of the tellurium recording layer, the tellurium oxide layer likely brings about deterioration of the recording characteristics of the recording layer, because recording sensitivity of tellurium oxide is relatively low.

SUMMARY OF THE INVENTION

Accordingly, the present inventors have studied an information recording medium having a recording layer which employs a combination of tellurium and selenium or a combination of tellurium, selenium and other element. In the course of study, they have found irregularity in sizes of pits formed in the recording layer containing Te and Se or formation of pits having size larger than an expected size. Such irregularity or formation of large pits decreases a resolving power and other recording characteristics of the recording medium.

It is an object of the present invention to provide an information recording medium which is satisfactory in recording and reproducing characteristics as well as in durability.

It is another object of the invention to provide an information recording medium having excellent recording and reproducing characteristics such as high resolution for reproducing recorded signals and a wide latitude which indicates an applicable range of a recording power for obtaining a high C/N (carrier to noise ratio).

It is a further object of the invention to provide an improvement of an information recording medium using a combination of tellurium and selenium or a combination of tellurium, selenium and other element.

It has been discovered by the inventors that the irregularity or enlargement of pit sizes occurring in a recording layer containing tellurium and selenium is obviated, with essentially no decrease of sensitivity, by providing a tellurium oxide recording layer on the Se-Te containing recording layer.

Accordingly, the invention provides an information recording medium comprising a substrate and a recording layer provided thereon which is capable of writing information with a laser beam, in which the recording layer comprises a layer composed of metals containing Se and Te and a layer provided thereon which is composed of $TeO_x$, wherein x is a value in the range of $1 \leq x \leq 2$.

DETAILED DESCRIPTION OF THE INVENTION

Figure 1:
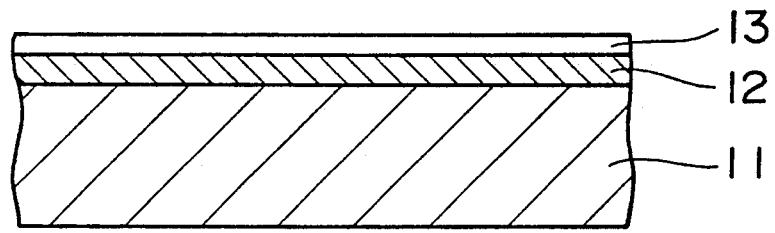
FIG. 1 is a schematic view showing a structure of an information recording medium according to the invention.

As illustrated in FIG. 1, the information recording medium of the present invention comprises a substrate 11, a tellurium-selenium containing recording layer 12 and a recording layer of tellurium oxide 13.

The information recording medium of the invention can be prepared, for example, by the following process.

Material of the substrate employed in the invention can be selected from any materials of the substrates of the conventional recording media. Examples of the substrate material include glasses such as soda-lime glass, acrylic resins such as cell-cast polymethyl methacrylate and injection-molded polymethyl methacrylate; vinyl chloride resins such as polyvinyl chloride and vinyl chloride copolymer; epoxy resins; polyesters such as polyethylene terephthalate; polycarbonates; and amorphous polyolefins. Preferably employed are polymethyl methacrylate, polycarbonates, epoxy resins, amorphous polyolefins and polyethylene terephthalate, and particularly preferred are polycarbonates.

The surface of the substrate on which a recording layer is to be formed may be provided with an undercoating layer for the purpose of improving smoothness, adhesion to the recording layer and preventing the recording layer from denaturation. Examples of the material of the undercoating layer include polymer materials such as polymethyl methacrylate, acrylic acid-methacrylic acid copolymer, nitrocellulose, polyethylene, polypropylene and polycarbonate; organic materials such as a silane coupling agent; inorganic oxides such as $SiO_2$ and $Al_2O_3$; and inorganic fluorides such as $MgF_2$.

When the substrate material is glass, an undercoating layer made of a polymer having a hydrophilic group and/or a maleic anhydride group such as a styrene-maleic anhydride copolymer is preferably provided on the substrate for preventing an adverse effect to the recording layer given by alkali metal ions and alkaline earth metal ions having been liberated from the substrate.

The undercoating layer can be formed on the substrate by dissolving or dispersing the above-mentioned material in an appropriate solvent to prepare a coating solution (i.e., dispersion) and then applying the coating solution onto the surface of the substrate by a coating method such as spin coating, dip coating or extrusion coating.

The substrate can be provided with a pre-groove layer for the purpose of forming a tracking groove or with a pre-pit layer for the purpose of forming protruded and depressed portions to give information such as address signals. As the material of the pre-groove layer or the pre-pit layer, employed is a mixture of at least one monomer (or oligomer) selected from the group consisting of monoester, diester, triester and tetraester of an acrylic acid and a photopolymerization initiator. The thickness of the pre-groove or pre-pit layer is generally in the range of 0.05 to 100 $\mu m$, preferably in the range of 0.1 to 50 $\mu m$. In the case of a plastic substrate, pre-grooves or pre-pits may be formed directly on the substrate. Alternativly, a pre-groove can be formed directly on the substrate by means of injection molding or extrusion molding.

On the substrate (if desired, through the pre-groove layer and/or the undercoating layer) an intermediate layer made of chlorinated polyolefin, nitrocellulose, polystyrene and fluororesins, etc. can be further provided. For example, in the case of providing a chlorinated polyolefin layer or a fluororesin layer, heat energy given under irradiation with a laser beam is prevented from escaping from the recording layer to the substrate through heat conduction and pits are easily formed on the recording layer. Hence, the recording sensitivity of the resulting medium can be highly enhanced and errors in the reading procedure (i.e., bit error rate) can be reduced.

The chlorinated polyolefin layer can be formed on the substrate (if desired, through the undercoating layer, etc.) by dissolving chlorinated polyolefin in a solvent to prepare a coating solution, coating the solution on the substrate and drying the coated layer. As the coating method, employed are spray coating, spin coating, dip coating, roll coating, blade coating, doctor roll coating and screen printing. The fluororesin layer can be, for example, formed on the substrate by sputtering polytetrafluoroethylene (e.g., Teflon available from Du Pont de Nemours & Co.) thereon. The thickness of the intermediate layer such as the chlorinated polyolefin layer or the fluororesin layer is generally in the range of 10 to 1,000 angstroms, preferably in the range of 100 to 500 angstroms. In the invention, the fluororesin layer is preferably provided as the intermediate layer under the layer composed of metals (i.e. recording layer) from the viewpoint of enhancing the recording and reproducing characteristics.

On the intermediate layer or directly on the substrate is then provided a recording layer.

The recording layer according to the invention comprises a layer composed of metals containing Se and Te (hereinafter, called a metallic layer) and a layer provided thereon which is composed of $TeO_x$, wherein x is a value in the range of $1 \leq x \leq 2$.

The metallic layer is preferably composed of $Se_a Te_b M_c$, wherein a, b and c are values in the ranges of $0.02 \leq a \leq 0.35$, $0.50 \leq b \leq 0.98$ and $0 \leq c \leq 0.45$, respectively and M is one metal selected from the group consisting of Pb, In, Ge, S, Sb, As, Bi, Sn, Al, Ga, Tl, Zn, Cd, Au, Ag, Cu, Ni, Pd, Rh, Cr, Mo, W and Ta. M is preferably one metal selected from the group consisting of Pb, Ge and Sb, and particularly preferable is Pb.

According to the invention, it is necessary to provide the layer composed of $TeO_x$ ($1 \leq x \leq 2$) on the metallic layer. In $TeO_x$ x is preferably in the range of $1.2 \leq x \leq 1.7$.

The aforementioned recording layer containing Se and Te (i.e. metallic layer) is satisfacroty in the recording sensitivity. However, as described before, pits formed in the recording layer containing Te and Se are generally apt to be irregular or unexpectedly large. Such irregularity or enlargement of pit sizes decreases a resolving power and other recording characteristics of the recording medium. It has been surprisingly discovered by the inventors that formation of irregular sized or large sized pits is effectively obviated by providing a layer of $TeO_x$ ($1 \leq x \leq 2$) on the metallic layer containing Se and Te, without lowering the high recording sensitivity of the recording layer.

It is not clear why the provision of tellurium oxide layer on the Se-Te containing recording layer effectively obviate the formation of pits of irregular size or unexpectedly large size. However, based on analysis by the inventors, the following is assumbed.

The Te-Se containing recording layer is prepared by vapor-depositing tellurium, selenium or other optional element on the substrate. The deposited layer is then subjected to heat treatment for causing crystallization of the deposited layer, so that a satisfactorily sensitive recording layer is produced. It has been known that the Te-Se containing material crystallizes locally in the layer before it is subjected to the heat treatment. Such previously crystallized portion is apt to form a grain of crystallization (mass of extremely grown crystal)

around the crystallized portion in the course of the subsequent heat treatment. Therefore, a great number of grains of crystallization are formed in the Te-Se containing recording layer. Heat conduction in the grain of crystallization is very high, as compared with that in area outside of the grain.

Figure 2A:
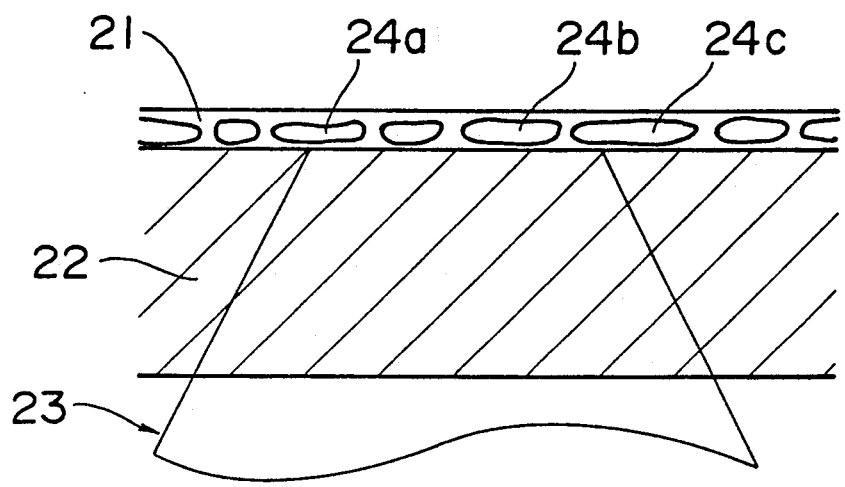
FIGS. 2a and 2b are schematic views illustrating a process of pit formation in a Te-Se containing recording layer of a known information recording medium.
Figure 2B:
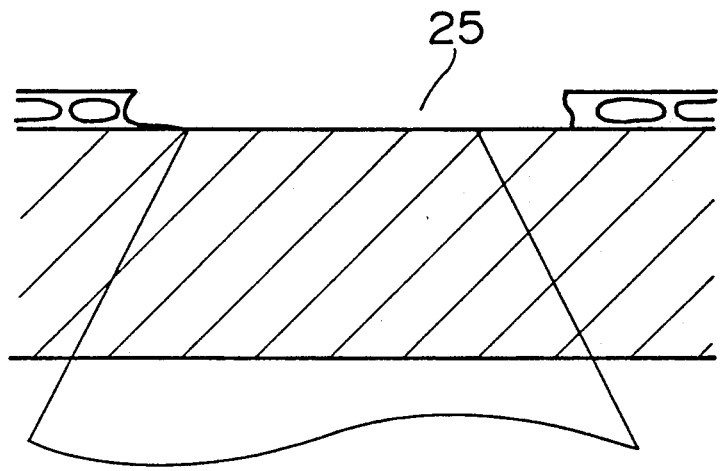

FIG. 2a schematically shows irradiation of a known recording medium having a Te-Se containing recording layer 21 on a substrate 22 with a laser beam 23. The recording layer 21 contains a number of grains of crystallization 24a, 24b, 24c, ---. When the laser beam 23 is applied onto the recording layer 21 through the substrate 22, the recording layer 21 is heated on the laser beam-applied spot and begins to melt on the laser-applied spot to form a pit on the spot. Theoretically, only the laser beam-applied spot is melted to form a pit having a size corresponding to the size of the spot of the laser beam. However, if the high heat conductive grains of crystallization 24a, 24c are present in the area on the periphery of the laser beam applied spot, the whole portion of grains of crystallization 24a, 24c are instantly melted at the time when the portion of the recording layer which has received the laser beam spot is melted. Therefore, an unexpectedly large-sized pit 25 is formed, as illustrated in FIG. 2b.

Figure 3A:
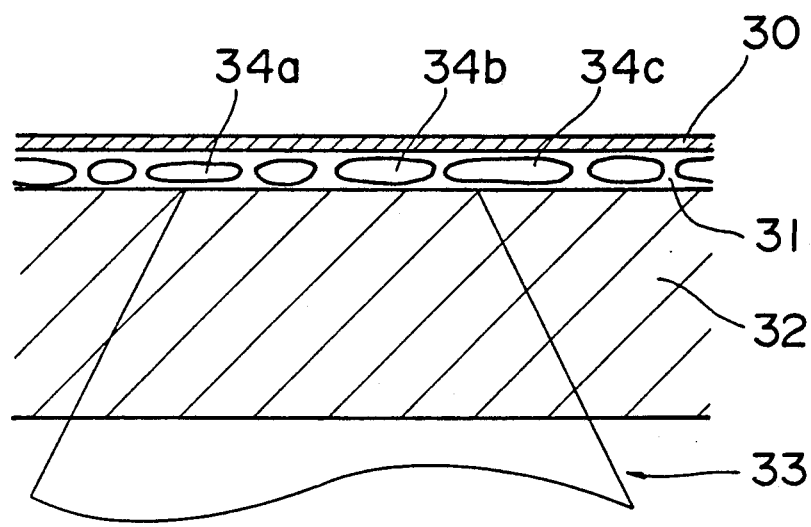
FIGS. 3a and 3b are schematic views illustrating a process of pit formation in a recording layer comprising a Te-Se containing metal layer and a tellurium oxide layer of an information recording medium according to the invention.
Figure 3B:
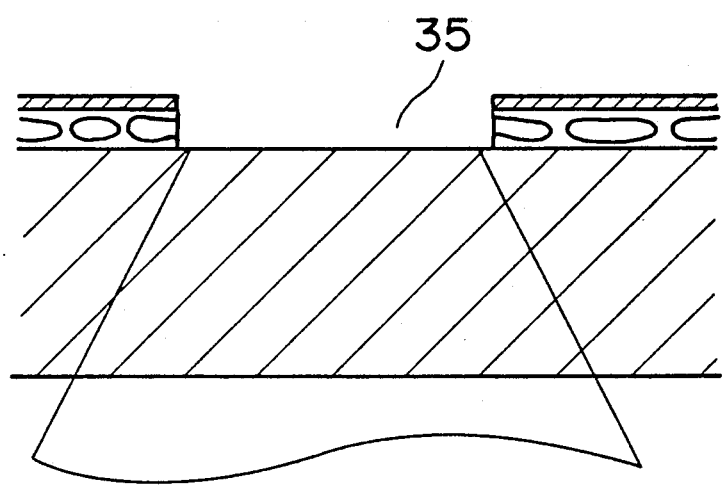

FIG. 3a schematically shows irradiation of a recording medium having a tellurium oxide recording layer 30 and Te-Se containing recording layer 31 on a substrate 32 with a laser beam 33. The recording layer 31 contains a number of grains of crystallization 34a, 34b, 34c, ---. When the laser beam 33 is applied onto the recording layer 31 through the substrate 32, the recording layer 31 is heated on the laser beam-applied spot and begins to melt on the laser-applied spot to form a pit on the spot. In the constitution of FIG. 3a, not a small portion of thermal energy of the laser beam 33 is rapidly transferred into the upper tellurium oxide recording layer 30. Therefore, transfer (conduction) of thermal energy provided by the laser beam from the laser applied spot to the outer area is reduced, even within grains of crystallization 34a, 34c. Therefore, a pit 35 formed in the recording layers 30, 31 has essentially the same size as the size of spot of laser beam 33. Thus, an expected small-sized regular pit is formed.

The easy formation of small pits brings about the remarkable enhancement of the recording and reproducing characteristics such as an especially high resolution of reproduction of recorded signals and a wide latitude which indicates an applicable range of a recording power for obtaining a high C/N. The reading durability which is evaluated by lowering of a C/N in the repeated reproducing procedure is also enhanced.

The layer composed of $TeO_x$ and the metallic layer are preferably in such a relationship as supports the following ratio. The ratio of the weight of Te contained in the $TeO_x$ layer and the total weight of Te contained in the metallic layer and the $TeO_x$ layer (Te in $TeO_x$/total Te) is preferably in the range of 0.1 to 0.6, more preferably in the range of 0.1 to 0.2. The ratio of the weight of Te indicates the relationship between thickness of the $TeO_x$ layer and that of the metallic layer, provided that both layers are substantially independent. Within the preferable range of the ratio of the weight of Te, the resulting medium is excellent particularly in the recording and reproducing characteristics.

The thickness of the recording layer is preferably in the range of 100 to 3,000 angstroms, more preferably in the range of 200 to 2,000 angstroms, from the viewpoint of balancing easiness of writing information with the reflectance. The thickness of the layer composed of $TeO_x$ is preferably in the range of 50 to 1,000 angstroms, more preferably in the range of 100 to 500 angstroms.

The metallic layer can be formed on the substrate by the conventional process such as vapor-depositing, sputtering or ion plating. Since two or more metals are used as the material, the metallic layer is preferably formed by depositing or sputtering. The layer composed of $TeO_x$ can be also formed on the metallic layer by the same conventional process. The value of x in $TeO_x$ varies depending upon the kind of a discharged gas, etc. in the case of forming the $TeO_x$ layer by sputtering. That is, x in $TeO_x$ is kept at 2 when $TeO_2$ is sputtered in an oxygen gas atmosphere, while x becomes a value smaller than 2 when $TeO_2$ is sputtered in another gas such as an argon gas. In the case that a small x value is desired, Te is sputtered in an oxygen gas atmospher under controlling the depositing rate of Te and the partial pressure of the oxygen gas to obtain the desired x value. The method for forming the $TeO_x$ layer is by no means restricted to the above ones, as far as the $TeO_x$ layer having a desired composition is obtained.

Alternatively, the recording layer may comprise the metallic layer, the layer composed of $TeO_x$ and a layer provided therebetween which is composed of a mixture of the material for the metallic layer and $TeO_x$. Such recording lauer is formed by first vapor-depositing the material for the metallic layer, vapor-depositing $TeO_x$ in the course thereof, terminating the vapor-deposition of Te subsequently and finally forming a layer composed of only $TeO_x$ as the uppermost layer.

On the recording layer a protective layer may be further provided. The protective layer preferably comprises a flexible protective layer made of a flexible (or soft) resin material and a rigid protective layer made of a rigid resin material. The protective layer is provided on the layer composed of $TeO_x$ in such a manner that the flexible protective layer faces the $TeO_x$ layer.

Examples of the flexible resin material include polyurethane, polyvinylidene chloride, ethylene-vinyl acetate copolymer, silicone rubber, styrene-butadiene rubber and polyacrylic ester. The flexible resin is usually applied onto the recording layer by means of solution coating, latex coating or melt coating and if necessary, dried or heat-treated to form a flexible protective layer. The thickness of the flexible protective layer is generally in the range of 100 angstroms to 5 $\mu$m, preferably in the range of 0.3 to 3 $\mu$m. Examples of the rigid resin material include ultraviolet-curing resins and thermosetting resins. The rigid resin is usually applied onto the flexible protective layer by solution coating and, if necessary, irradiated with ultraviolet rays or heated to form a rigid layer. The thickness of the rigid protective layer is generally in the range of 0.1 to 10 $\mu$m, preferably in the range of 1 to 3 $\mu$m.

On the free surface of the substrate (surface not facing the recording layer), a thin film made of an inorganic material such as silicon dioxide, tin oxide, manganese fluoride or the above-mentioned $TeO_x$, or a polymer material such as a thermoplastic resin or a photosetting resin may be formed by means of vacuum depositing, sputtering or coating in order to increase resistance to damage and resistance to moisture.

A recording medium of two substrates combined-type can be prepared by joining two substrates having the above-described structure using an adhesive, etc. A recording medium of air-sandwich type can be prepared by joining two disc-shaped substrates, at least one of which having the above-described structure, by interposing therebetween a ring-shaped inner spacer and a ring-shaped outer spacer or through protrusions previously provided on one or both substrates.

Recording of optical information can be carried out using the above-described recording medium by the following method.

In the first place, the recording medium is irradiated with light for the recording (i.e., recording light) such as a semiconductor laser beam from the substrate side under rotation of the medium at a fixed linear velocity or a fixed angular velocity. As the recording light, a semiconductor laser beam having a wavelength in the region of 750 to 850 nm is generally employed. The information can be generally recorded at a recording power of 3 to 15 mW.

Under irradiation with the laser beam, pits of 0.70 to 4.0 μm are formed on the recording layer at intervals of 0.70 to 4.0 μm in the form of concentric circles or in a spiral form. The recording is preferably conducted under tracking control by use of a tracking pre-groove. In the case that a pre-groove is provided on the medium, the recording of signals may be done on a bottom of the grooves or on a land between the grooves.

Reproduction of the recorded information can be carried out by irradiating the medium with a semiconductor laser beam from the substrate side under rotation of the medium at the same linear or angular velocity as mentioned above and detecting the reflected light.

Examples of the present invention and comparative examples are given below, but these examples by no means restrict the invention.

EXAMPLE 1

On a disc-shaped polycarbonate substrate having a tracking groove thereon (outer diameter: 130 mm, inner diameter: 15 mm, thickness: 1.2 mm; provided with a groove having depth of 0.07 μm, width of 0.7 μm and pitch of 1.6 μm in the spiral form within an area of from inner diameter of 60 mm to outer diameter of 120 mm), Teflon (available from Du Pont de Nemours & Co.) was sputtered to form an intermediate layer of 300 angstroms thick.

Then, Te, Se and Pb were sputtered together in the ratio of 64:30:6 (Te:Se:Pb, by atomic %) on the intermediate layer to form a metallic layer. On the metallic layer $TeO_2$ was sputtered to form a layer composed of $TeO_{1.6}$.

Conditions of Sputtering

Discharge gas: Argon
Pressure: 1 Pa
Distance between Target and Substrate: 100 mm Thus, a recording layer consisting of the metallic layer and the $TeO_{1.6}$ layer was provided on the intermediate layer. The weight of Te contained in the total weight (total thickness) of the metallic layer and the $TeO_{1.6}$ layer was 11.4 μg/cm², and the ratio of the weight of Te contained in the $TeO_{1.6}$ layer to the total weight of Te contained in the metallic layer and the $TeO_{1.6}$ layer was 1:2 (=0.5), by weight.

Thus, an information recording medium composed of a substrate, an intermediate layer, a metallic layer and a $TeO_{1.6}$ layer, superposed in order, was prepared.

EXAMPLE 2

An information recording medium was prepared in the same manner as described in Example 1 except for sputtering Te, Se and Pb together in the ratio of 78:18:4 (Te:Se:Pb, by atomic %) to form a metallic layer, and varying the ratio of the weight of Te contained in the $TeO_{1.6}$ layer to the total weight of Te contained in the metallic layer and the $TeO_{1.6}$ layer to 1:8 (=0.125), by weight.

Comparison Example 1

An information recording medium was prepared in the same manner as described in Example 2 except for not forming a $TeO_{1.6}$ layer.

Evaluation of Information Recording Medium (1) Resolution (Res)

On each of the obtained recording media was recorded binary information using a semiconductor laser beam having wavelength of 830 nm at fixed linear velocity of 5.5 m/sec., at writing frequency of 3.63 MHz and 1.36 MHz and at on-pulse of 90 nsec. Then, an amplitude (I) of each frequency was measured using the above semiconductor laser beam at reading power of 1.0 mW and a resolution was calculated based on the following equation.

$$\text{Resolution (Res)} = \frac{I(3.63 \text{ MHz})}{I(1.36 \text{ MHz})} \times 100$$

(2) Reading durability

On each of the obtained recording media was recorded binary information using a semiconductor laser beam having wavelength of 830 nm at fixed linear velocity of 7.5 m/sec., at writing frequency of 3.63 MHz and at on-pulse of 90 nsec. Then, an amplitude (I) of the frequency was measured using the above semiconductor laser beam at reading power of 1.4 mW. Lowering of the amplitude at 360 min. after starting the reading of the information was estimated.

Results of the measurements are shown in Table 1.

TABLE 1

|  | Resolution (Res) | Lowering of Amplitude (%) |
| --- | --- | --- |
| Example 1 | 48 | — |
| Example 2 | 41 | 0 |
| Com. Example 1 | 30 | 3 |

It is evident from the results given in Table 1 that the information recording media (Examples 1 and 2) of the invention in which the specific metallic layer was provided with the $TeO_x$ recording layer are improved in the resolution and resistance to lowering of amplitude, as compared with the known recording medium (Comparison Example 1) having no $TeO_x$ layer. Accordingly, it is clear that the provision of the $TeO_x$ layer on the metallic layer apparently does not deteriorate the recording and reproducing characteristics but improves them.

We claim:

1. An information recording medium comprising a substrate and a recording layer provided thereon which is capable of writing and/or reading information with a laser beam, in which the recording layer comprises a layer composed of metals containing Se and Te and a layer provided thereon which is composed of $TeO_x$, wherein x is a value in the range of $1 \leq x \leq 2$, and which has a thickness in the range of 50 to 500 Å.

2. The information recording medium as claimed in claim 1, in which said layer composed of metals has a composition represented by $Se_a Te_b M_c$, wherein a, b and c are values in the ranges of $0.02 \leq a \leq 0.35$, $0.50 \leq b \leq 0.98$ and $0 \leq c \leq 0.45$, respectively, and M is one metal selected from the group consisting of Pb, In, Ge, S, Sb, As, Bi, Sn, Al, Ga, Tl, Zn, Cd, Au, Ag, Cu, Ni, Pd, Rh, Cr, Mo, W and Ta.

3. The information recording medium as claimed in claim 2, in which M is one metal selected from the group consisting of Pb, Ge and Sb.

4. The information recording medium as claimed in claim 1, in which x in $TeO_x$ is a value in the range of $1.2 \leq x \leq 1.7$.

5. The information recording medium as claimed in claim 1, in which a ratio of weight of Te contained in the layer composed of $TeO_x$ to a total weight of Te contained in the layer composed of metals and the layer composed of $TeO_x$ is in the range of 0.1 to 0.6.

6. The information recording medium as claimed in claim 1, in which an intermediate layer comprising a fluororesin is provided between the substrate and the recording layer.

7. The information recording medium as claimed in claim 1, in which the layer of $TeO_x$ has a thickness in the range of 100 to 500 Å.

* * * * *